Patented Aug. 4, 1936

2,049,785

UNITED STATES PATENT OFFICE 2,049,785

RUBBER VULCANIZATION ACCELERATOR

William F. Tuley, Naugatuck, Conn., assignor to United States Rubber Products, Inc., New York, N. Y., a corporation of Delaware No Drawing. Application January 31, 1936, Serial No. 61,758

3 Claims. (Cl. 18—53)

This invention relates to a novel accelerator composition useful in the production of vulcanized rubber.

One of the difficulties in this art is the provision of accelerating agents which will adequately disperse in the rubber to allow uniformity of cure and good ageing products. Many solid accelerators are difficult to disperse and lumps of over-accelerated rubber are often found in the cured product. This un-uniformity of cure gives a composition of undercured and overcured rubber which ages poorly and is inferior in other respects. Among such solid accelerators are the metallic salts such as the zinc salt of mercaptobenzothiazole, referred to in U. S. Patent No. 1,544,687. It is an object of this invention to avoid these disadvantages by a special pretreatment of the solid substantially insoluble accelerator. It is a further object of the invention to provide a substantially non-discoloring accelerating agent, which is suitable for use with practically all types of rubber products, and particularly useful for proofing, footwear and other air cured products when activated with either a dithiocarbamate, guanidine or an aldehyde-amine type of accelerator, or a thiuram sulphide accelerator such as tetramethyl thiuram mono-sulphide.

According to the invention a metallic salt of a mercapto-aryl-thiazole accelerator such as the zinc salt of mercaptobenzothiazole is blended with the zinc soap of cocoanut oil acids by solution in the melted soap and then cooling. This soap is produced by reacting under heat zinc oxide or carbonate with the proportionate amount of cocoanut oil. A preferred suitable composition is made by blending 75 parts by weight of the zinc soap with 118 parts by weight of the zinc salt of mercaptobenzothiazole. A preferred way of making the blend is to dissolve in the molten zinc soap, an amount of zinc oxide and mercaptobenzothiazole sufficient to react in situ in the zinc soap, while stirring. If desired, the zinc oxide may be slightly in excess to insure substantially complete conversion of the mercaptobenzothiazole. In this way the product of the zinc soap and the zinc salt is more homogeneous. These proportions may be varied, if desired, in accordance with the most suitable ratio of zinc soap and zinc salt of mercaptobenzothiazole and considering the presence or absence of use of other accelerators or activators during the vulcanization of the rubber. Just what the phenomena of association is between the two components is not definitely known. The blended mass has a softening range very slightly higher than the zinc soap alone and softens and melts in the rubber substantially as a unit.

The aforesaid combination of the zinc soap and the zinc salt of mercaptobenzothiazole is a solid of a light yellow color which may be pulverized. It is insoluble in water, partly soluble in alcohol, slightly but completely soluble in warm benzene. It is chemically stable and is not affected by light or by storage over long periods of time. It softens and substantially completely melts at ordinary rubber processing temperatures; when milled into pale crepe in the ratio of 2 to 3 parts by weight of the blend per 100 parts by weight of the rubber, on a cool mill, it gives a perfectly transparent mix and shows no pigmenting effect such as accompanies the separate addition of the zinc soap and the zinc salt of mercaptobenzothiazole to rubber on the mill. An accelerator agent having such complete solubility in rubber and low melting temperature insures substantially perfect dispersion. In addition the material is substantially non-staining, non-discoloring. When molten it starts to solidify at 85–80° C.

The following data shows its benefits in a white air-cured stock; the parts are by weight, "Accelerator" indicating the accelerator blend first indicated above.

Composition of stock

| | Parts |
|---|---|
| Pale crepe | 100 |
| Zinc oxide | 31 |
| Lithopone | 69 |
| Whiting | 14 |
| Dixie clay | 19 |
| Sulphur | 2 |
| Tetramethyl thiuram monosulphide | 0.1 |
| Accelerator | 1.93 |

Unaged

| Cure in minutes at 260° F. | Tensile at break lbs./sq. in. | Elongation percent at break |
|---|---|---|
| 5 | 2800 | 636 |
| 10 | 2550 | 643 |
| 20 | 2760 | 616 |
| 30 | 2750 | 636 |
| 45 | 2620 | 636 |

Aged 120 hours in oxygen bomb

| | | |
|---|---|---|
| 5 | 2600 | 600 |
| 10 | 2240 | 613 |
| 20 | 2400 | 606 |
| 30 | 2100 | 570 |
| 45 | 1600 | 563 |

Scorch test

| | | |
|---|---|---|
| 30 minutes at 5 lbs./sq. in steam pressure | Uncured | 500 |
| 45 minutes at 5 lbs./sq. in. steam pressure | 2447 | 612 |

The stock showed a good white color with no discoloration after curing or exposure to sunlight.

The preformed blended material is a superior accelerator for tire tread composition because it mixes so readily with rubber to give substantially perfect dispersion and uniformity. It also may be used in tire carcass stocks, and in highly compounded stocks such as soling stocks.

The invention may be applied in connection with other than mercaptobenzothiazole salts, e. g. it may be used with mercaptotolyl-thiazole, mercapto-xylyl-thiazole, mercapto-naphtho-thiazole, chor- or nitro-substituted mercaptobenzothiazoles, or other mercapto-aryl thiazole salts of the heavy metals such as zinc, etc.

Having thus described my invention, what I claim and desire to protect by Letters Patent is:

1. A composition having a high degree of dispersibility in rubber and composed of a blended homogeneous mass comprising the zinc salt of mercaptobenzothiazole dissolved in the zinc soap of cocoanut oil acids, and characterized as substantially unaffected by light or storage over a long period of time, which, when molten starts to solidify at 85–80° C.

2. A composition having a high degree of dispersibility in rubber and composed of a blended homogeneous mass comprising a heavy metal salt of a mercaptobenzothiazole and a metallic salt of cocoanut oil acids.

3. A composition having a high degree of dispersibility in rubber and composed of the product of reaction of zinc oxide and a mercaptobenzothiazole associated with the zinc salt of cocoanut oil acids.

WILLIAM F. TULEY.